United States Patent [19]
Watters

[11] Patent Number: 6,061,175
[45] Date of Patent: May 9, 2000

[54] MULTI-FOCAL-RATIO REFLECTOR TELESCOPES

[76] Inventor: George M. Watters, 17888 S. Watson Rd., Coeur d'Alene, Id. 83814-8278

[21] Appl. No.: 09/090,129

[22] Filed: Jun. 3, 1998

[51] Int. Cl.[7] .............................. G02B 17/00; G02B 5/08
[52] U.S. Cl. ........................ 359/366; 359/364; 359/399; 359/857
[58] Field of Search .................... 359/364–366, 359/399–407, 354, 358, 359, 421, 422, 432, 856–860, 725–733

[56] References Cited

U.S. PATENT DOCUMENTS

| | | | |
|---|---|---|---|
| 2,504,384 | 4/1950 | Bouwers | 359/364 |
| 2,628,529 | 2/1953 | Braymer | 359/366 |
| 3,645,602 | 2/1972 | Clave et al. | 359/421 |
| 3,876,875 | 4/1975 | Velzel | 359/364 |
| 4,119,107 | 10/1978 | Pinzone et al. | 359/860 |
| 4,265,510 | 5/1981 | Cook | 359/356 |
| 4,397,547 | 8/1983 | Grassl | 359/857 |
| 5,132,836 | 7/1992 | Fundingsland | 359/364 |
| 5,134,519 | 7/1992 | Abele et al. | 359/402 |
| 5,329,407 | 7/1994 | Sasaki et al. | 359/849 |
| 5,414,564 | 5/1995 | Pausch et al. | 359/846 |
| 5,424,876 | 6/1995 | Fujii | 359/884 |
| 5,430,577 | 7/1995 | Hügenell | 359/846 |
| 5,477,393 | 12/1995 | Sasaki et al. | 359/846 |
| 5,576,884 | 11/1996 | Ise et al. | 359/514 |
| 5,583,704 | 12/1996 | Fujii | 359/884 |
| 5,592,338 | 1/1997 | Citterio | 359/883 |
| 5,617,262 | 4/1997 | Ise et al. | 359/846 |
| 5,640,282 | 6/1997 | Ise et al. | 359/846 |

*Primary Examiner*—Thong Nguyen
*Attorney, Agent, or Firm*—David S. Thompson

[57] ABSTRACT

The invention is a multi-focal-ratio reflector telescope which uses a primary mirror which can be rotated or flipped and is surfaced on at least two sides. The invention is useful to expand viewing options for astronomy and terrestrial observing. There are two major features of the invention which vary from the current art: A) Primary mirror blank/s are cut, finished and polished on at least two surfaces (or previously finished mirrors are laminated back-to-back or attached to a common structure to achieve this effect) to allow for multi-focal-ratio use; and B) mechanical and/or optical structures are provided to allow adjustment of the effective scope length for resultant primary mirrors which have more than one focal length. Telescopes equipped with the invention reduce the need for using a large variety of viewing accessories such as eyepieces and finder scopes. Magnification accessories such as eyepieces and Barlow lenses can also be increased in utility as a result of this invention. The invention can be embodied in a number of ways as a Newtonian or Cassegrain type telescope.

5 Claims, 9 Drawing Sheets

MULTI-FOCAL-RATIO REFLECTOR TELESCOPES

BACKGROUND

1. Field of the Invention

The field of invention is telescopes used for various terrestrial and sky viewing interests and needs. This type of device is generally covered under patent class 359 (although other classes are also relevant to aspects of the invention). Reflector telescopes (those using a "primary mirror") are the sub-field of telescopes affected by the invention.

2. Description of Prior Art

For several years preceding the invention I purchased and/or built several telescopes for different purposes. Both land viewing and amateur astronomy were among my interests. I found that a reflector telescope was the most cost-efficient viewing instrument for many applications. I also discovered that when I wanted to use one telescope for various purposes (e.g. land viewing and astronomy) I had to buy expensive accessories, accept compromised viewing options, and/or buy a new telescope more appropriate to my specialized viewing interests. After I had acquired several telescopes and numerous accessories for different purposes and sub-purposes (e.g. viewing nebula vs. planets in astronomy), I intensified my search for strategies to make one reflector telescope more versatile. During the summer of 1996 I got an idea which is the basis of this invention. The idea involved finishing a primary mirror on two sides with different focal ratios and providing mechanisms to flip the mirror and adjust the scope for different viewing options. Initially I did not know whether the idea was new so I conducted an extensive review of literature concerning currently available commercial telescopes. The only "mirror flipping" strategies which I discovered in current use for telescopes involved diverting light at or near the telescope's eyepiece to facilitate astronomical photography and other viewing options. No primary mirror flipping strategy was discovered. When I found no telescope similar to the one which I had conceived, I did an extensive library and computer-based search of patent records. Patent classes 359, 33, 356, 264, 269, 362, 396, 227, 427, 428, 234, and 353 were among the areas searched. Again I found no similar devices. I then began to develop the idea to a concrete set of strategies and mechanisms for production. In July 1997 I prepared an initial description of the invention. That description was reviewed and witnessed by several people. Also beginning in 1997, I began sub-set prototype development and created specifications for optics to support the invention. During the prototype development process initial specifications were refined and expanded and preferred initial deployment strategies were selected. This document describes the invention as currently conceived and developed through limited prototype development.

The basic strategy for a reflector telescope was invented several hundred years ago. In 1672 Isaac Newton was attributed with the development of a workable reflector telescope. The use of glass as the substrate for primary mirrors in reflectors is attributed to Leon Foucault in 1856. Telescopes which implement many of the strategies of Newton and Foucault are called "Newtonians". Other reflector scopes, e.g. Cassegrains, have further developed and refined the basic light reflection, magnification and focus strategies of the Newtonian. Many devices such as eyepieces, finder scopes, mirror cells, alternate aiming devices, mounts, tracking systems, etc. have been developed over the centuries to supplement and improve on the basic reflector telescope design. This invention utilizes basic Newtonian and Cassegrain designs and supplements them with added value. Added value results from the addition of multi-focal-ratio capacity to the primary mirror. Several dual-focal-ratio embodiments of this multi-focal-ratio primary mirror invention are described in this application.

Currently, "reflector" telescopes can provide a cost-efficient way of viewing distant objects under magnification. However, the efficiency and precision of long-distance viewing with these devices varies by telescope design. The "focal ratio" of a reflector telescope is a prime determiner of effective light-gathering, field of view, and magnification of the object observed. Different focal ratios provide viewing advantages and disadvantages depending upon distance between the observer and the object being viewed and viewer preferences for lighting, magnification and field of view.

The "primary mirror" is the principle light-gathering, transfer, and focus-causing agent for a reflector telescope. Currently, reflector telescopes available for both astronomical and terrestrial observation are limited by a single fixed-focal-ratio of the scope's primary mirror. The mirror is cut to a precise surface curve and coated for reflection on one face. The curve at which the mirror is cut determines the scope's focal ratio. And, the focal ratio determines point of focus, effective light gathering, and magnification. The mirrored surface is backed by a hard substrate to provide the rigidity necessary to maintain a precisely cut and finished curve (e.g. a parabola). Variance in magnification is provided by structures remote from the primary mirror such as intervening lenses, secondary mirrors, or most commonly by eyepieces. But all use of the telescope is limited to the functions feasible for the single focal ratio of the selected primary mirror.

As a result a telescope built with a single-focal-ratio primary mirror is either specially made for limited purposes or is a compromise for general use. The functional problems with this are many. For example, in astro-photography or "deep sky" observation, a short focal ratio primary mirror is often preferable because of a wider field of view and the fact that more effective light is passed to the camera and/or eyepiece. However short focal ratio mirrors provide less image magnification helpful for such functions as planetary observation. Therefore telescope users who want to view objects which are better seen with different focal ratios select among numerous eyepieces, choose a scope which provides a compromise fixed-focal-ratio, or they buy more than one scope. The disadvantages of numerous eyepieces include their cost and the fact that they do not change the instrument's focal ratio which is a primary determiner of effective light gathering. The disadvantage of a compromise focal ratio is that often none of the viewing options precisely match the need of the user. Problems with the procurement of multiple scopes include such issues as duplication of many costs for manufacturers and product users, waste of materials, lack of portability, and excessive storage requirements.

As mentioned earlier, the current art for primary mirrors involves creating reflection capability on one face only, and using a substrate thickness proportionate to the mirror diameter. This proportional relationship is determined by the type of material from which the mirror substrate is made. The primary purpose of the substrate is to maintain rigidity of the mirror's reflective curve under normal variance of use in different atmospheric conditions. (For a Pyrex mirror for example, the estimated optimal ratio is about six to one—diameter to thickness. Therefore a six-inch wide mirror would be about one inch thick to maintain the desired surface curve under varying conditions.)

SUMMARY OF THE INVENTION

The invention is the basis for reflector telescopes designed to provide high-quality multi-viewing options. It utilizes a primary mirror which can be rotated or flipped and has been cut and finished on more than one side. Each side is cut to a different focal ratio. This device multiplies the advantages and reduces the need for telescope accessories such as eyepieces and finder scopes The object of the invention is to provide a more versatile reflector type telescope than is currently available. The invention provides the following advantages over current art:
1. High quality sky and land viewing systems can be combined in one telescope.
2. The overall cost of observing for those people with diverse viewing interests or needs can be reduced because some common accessories gain added value (e.g. eyepieces), other accessories are not always necessary (e.g. finder scopes), and common structures (e.g. telescope mounts) can be seamlessly shared.
3. Telescope accessories such as "finder scopes" and "Barlow lenses" are not necessary in many situations because the invention facilitates ease of shifting between low and high magnification viewing.
4. Storage and transportation requirements are sometimes reduced because one telescope system provides the utility of two telescopes.
5. Astro-photography is facilitated by easy shifting between viewing and photography.
6. The overall cost of telescope eyepieces is reduced because each available eyepiece can have more than one image-magnification value.

DESCRIPTION OF DRAWINGS

All drawings submitted with this patent application are informal (i.e. intended to help illustrate the invention and some modes of implementing the invention). Some aspects of the invention, such as desired focal ratios, mirror diameters, tube materials, etc., will vary as the invention is produced. Therefore proportion represented is not intended to be a precise blueprint for production. In several of the Figures provided with this disclosure (FIG. 1, FIG. 2, FIG. 3, FIG. 10, FIG. 11, FIG. 12, FIG. 13, FIG. 14), dashed lines and dashed lines with arrow-heads indicate a rough angle and distance to point of focus. They are used to help the reader visualize the flow of light through the telescope. In FIGS. 1, 2, and 3, point of focus is illustrated with the symbol "*". Mechanical details (e.g. mounts, holding brackets, etc.) relevant to most telescopes are not included in these illustrations. FIGS. 5 through 14 are all rough cut away drawings illustrating relative placement of critical components within a telescope tube. In most practical implementations the components shown in these cut away drawings would only be partially visible by looking down the opening in the front of the telescope tube.

DETAILED DESCRIPTION OF THE INVENTION

Multi-faced and Coated Surfaces Using the Same Mirror Substrate: Unlike conventional mirrors used for such functions as human reflection, the reflective coatings of telescope mirrors are usually surface coated (i.e. the reflection occurs at the surface of the glass rather than from under a protective sheet of glass). This permits maximum reflection without distortion caused by light passing through a thick plate of glass. As mentioned earlier, the thickness of material used for telescope primary mirrors is required primarily to maintain the surface curvature. With no or very slight addition to the substrate thickness, the invention permits shapes to be preserved and allows for multi-plane surfacing and coating to provide for two focal ratios. (For example: under current art, a Pyrex mirror six inches in diameter should be approximately one inch in thickness. If the mirror is surfaced and coated both front and back, very little additional substrate material is required to allow for two thermally stable surfaces cut to different focal ratios. Both faces will share a substantial substrate which maintains an optimal six to one thickness-to-diameter ratio).

The invented primary mirror is defined by the following. A multi-faced and coated mirror which is cut to different focal ratios on each reflective surface and which uses a shared substrate mass or other support structure at a thickness necessary to support the desired curve dynamics of each reflective surface.

Mechanical, electrical, and optical devices to support multiple focal lengths. The invention requires strategies to rotate the primary mirror and change the effective length of the telescope for multi-focal-ratio capability). The descriptions below present alternate embodiments to achieve these objectives for dual focal ratio use. The embodiments presented below are not fully exhaustive of the range of possibilities for the invention. Mechanical and optical strategies described below are meant only to illustrate several feasible embodiments. Also, materials used in telescope construction may vary greatly and are therefore not generally discussed unless they relate to special features of the invention.

Figure 1:
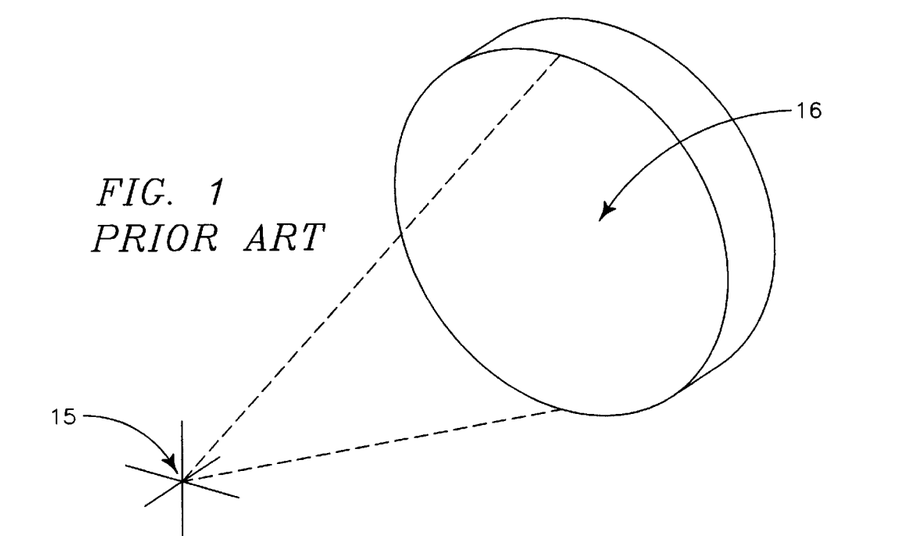
FIG. 1 illustrates a current-art primary mirror which is finished on one side.
Figure 2:
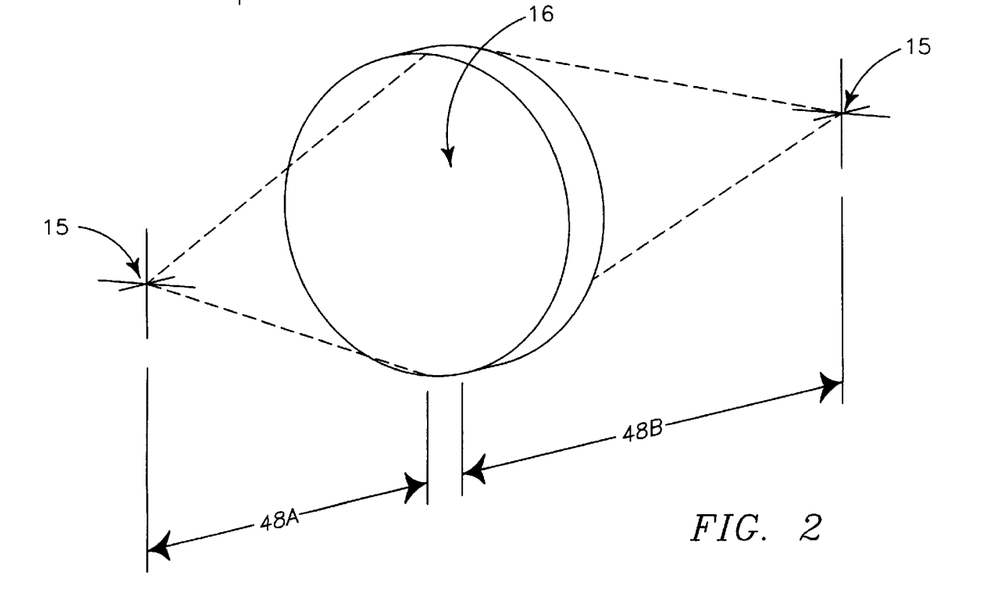
FIG. 2 illustrates a two-sided mirror cut to different focal ratios on each side.
Figure 3:
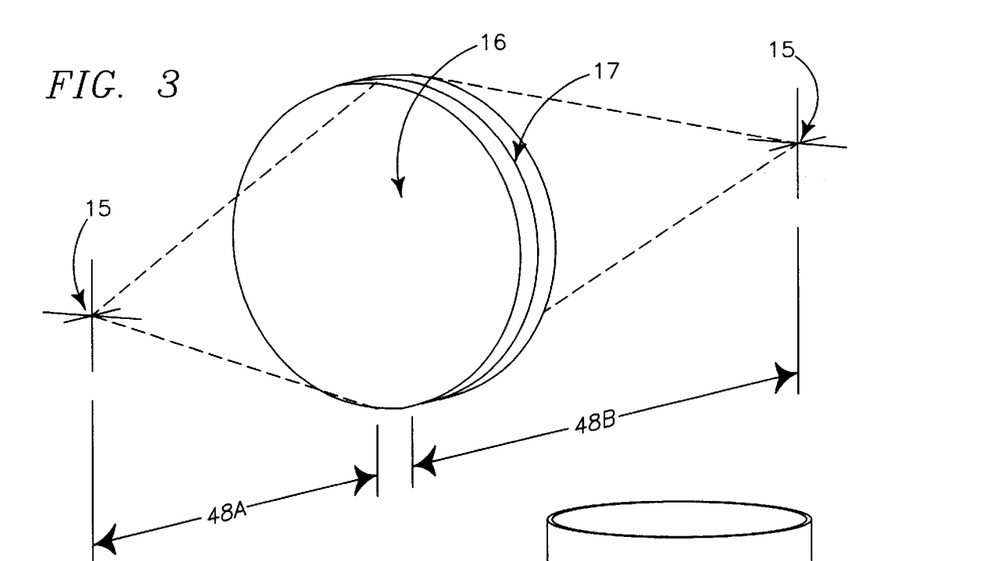
FIG. 3 illustrates a two-sided mirror created by laminating two one sided mirrors back-to-back.
Figure 4:
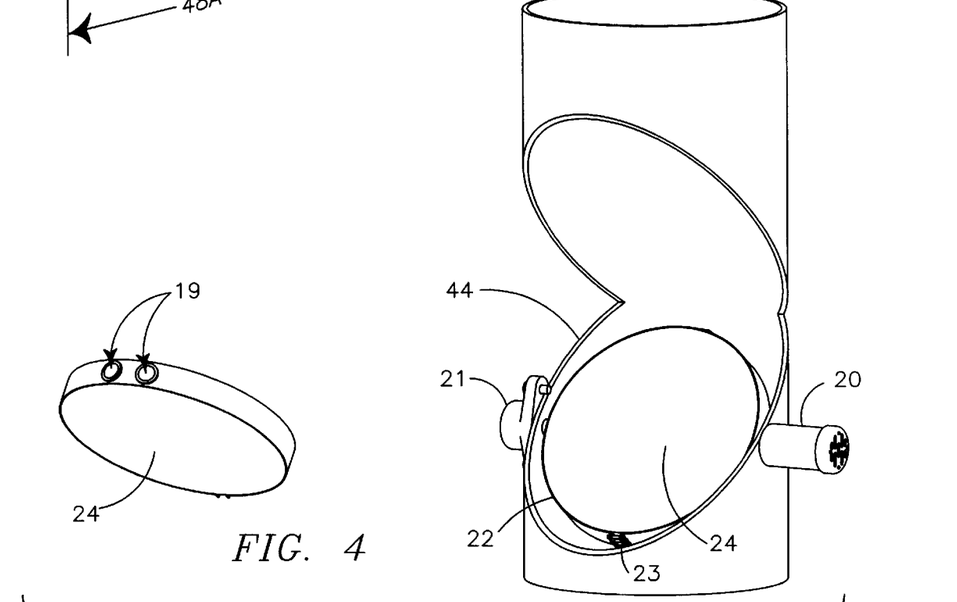
FIG. 4 illustrates a double-sided mirror surrounded by a retaining ring and attached to the tube wall of a telescope. (The illustrated position in FIG. 4 is not functional for telescope viewing).

Rotation system for primary mirror. The invention provides structure and process to allow for the rotation of a mirror between usable planes while keeping the scope precisely aligned and directed toward the object being observed. Current art provides for holding the primary mirror in one (slightly adjustable) place with the assistance of a "primary mirror cell." The purpose of the cell is to support a consistent position of the mirror while allowing for slight adjustment. This mirror cell usually consists of a back plate, a method to secure the mirror to the back plate, and at least three (or more) adjustable hold-down bolts and associated springs, nuts, etc. This back-plate-based configuration allows pointing only one surface of the mirror to a light source. FIG. 4 shows how the invention's primary mirror is surrounded by an alternate mirror-cell band with supporting 180 degree offset axis pins. This band is fitted with pivot pins protruding away from the mirror and located 180 degrees apart. Unlike the backing plate strategy, the band provides the ability to expose two planes of the mirror to reflective light. The band is composed of a substance (e.g., semim-malleable plastic has been used in prototype development) with thermal characteristics which will not cause alteration of the mirror's surface curves under varying atmospheric and climatic situations. The outside of the telescope tube is fitted with two bearings, adjustable slightly in location to assist in fine collimation (aiming) of the mirror. The band is also fitted with two lock-pin holding slots—one for each of the two possible mirror positions. When the mirror is rotated, a lock-pin relevant to the new position is inserted in the relevant slot to hold the mirror securely in place. In each viewing position the mirror is therefore held in a rigid position at three points: At each end of the pivot and by the relevant lock-pin. Lock-pin assemblies on the telescope tube are also adjustable in position to facilitate fine individual alignment for each face of the mirror.

Effective telescope length and focal ratio selection. Selection of the focal ratios for a two-faced primary mirror is critical to the proportion and structure of a telescope and to the scope's utility and versatility. For example, a one-sided primary mirror can be configured in a telescope with two fixed aperture eyepieces and a fixed power 2× Barlow lens to permit as many as four magnification options. The same telescope and accessories when fitted with a two-sided primary mirror can provide eight magnification options. However, this is only possible by a careful selection of focal lengths for each side of the primary mirror in relation to the diameter of eyepieces used. Knowledge of the viewing need, available eyepieces, and Barlow lenses are necessary elements to focal ratio selection. The preferred selection is one which achieves viewing need and maximum viewing magnification options at minimal cost.

Since it is the immediate intention of the inventor to utilize available third-party produced eyepieces and Barlow lenses in the production of telescopes, prototype primary mirror focal ratios have been selected by analysis of availability, cost, and utility of relevant third-party produced devices. However, a telescope maker with production rights to this invention and the ability to easily specify, produce, and/or sell unique eyepiece diameters may choose to create a focal ratio relationship which is not supportive of commonly available eyepieces. Such a strategy could provide special utility and make it difficult for telescope users to utilize other than "special" eyepieces (thus creating competitive advantage for the sale of proprietary eyepieces). The invention disclosure does not reveal a specified focal relationship between the surfaces of the primary mirror because market and production conditions will strongly influence the optimal relationship and ratios.

Effective telescope length and mechanical and optical adjustments. Primary mirror surfaces of the same diameter and different focal ratios require different effective telescope lengths for proper focus. This invention disclosure describes several possible embodiments of strategy, and inventor preferences, to utilize the same telescope body or tube while using two focal ratios from a primary mirror which can be rotated. Five alternate dual-focal-ratio embodiments are described in the next section. These alternatives are not meant to be exhaustive of all possible dual or other multi-focal-ratio embodiments. A general principle of all embodiments, however, is that distance from the mirror surface to the telescope eyepiece must be adjustable to allow for multi-focal ratios. One embodiment illustrated in FIGS. 13 and 14 achieves this result optically by using optical relay lenses. All other embodiments illustrated achieve this by mechanical or electromechanical adjustment.

Making dual-faced primary mirrors. The art of making primary mirrors suitable for use in a reflector telescope is well developed and established. Numerous companies and individuals in the United States and abroad produce such mirrors. In general all principles and practices relevant to the art of producing reflector telescope mirrors apply to this invention. Therefore, this art need not be described in this narrative. However, three special strategies are advised to produce double-faced mirrors. The substrate thickness selected for the mirrors should be determined based upon optimal thickness-to-diameter ratios after the depth of cut for both curved and finished surfaces has been estimated. A temporary protective backing plate or specialized fixture is advised to protect one face while the other face is being cut, figured, and finished. Reflective coatings must be applied through one of the available processes which permits uniform coating on more than one plane.

To operate the main embodiment of the invention, the operator of the telescope selects from among the focal ratio viewing options. This is done mechanically or with the assistance of switches and electrical motors. Two events occur with this choice: the primary mirror is rotated (if necessary) to the selected position and, eyepiece to mirror distance adjustments are made to correspond with that selection. Particulars of operation depend upon the embodiment strategy and examples are described under later sections which delineate alternative embodiments.

Description and operation of alternative embodiments: Newtonian type telescopes. The invention provides at least four alternate methods for adjusting effective telescope length in a Newtonian-type telescope. Associated optical and mechanical structures provide the ability to accommodate to a dual-focal-ratio capability.

Figure 5:
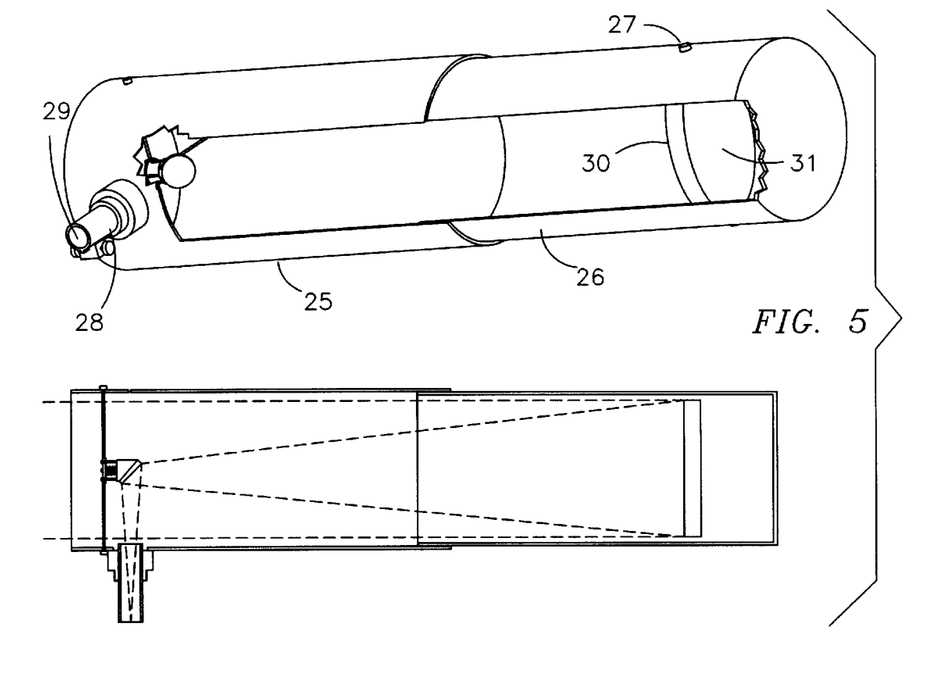
FIGS. 5 and 6 illustrate a telescoping tube mode of deployment.
Figure 6:
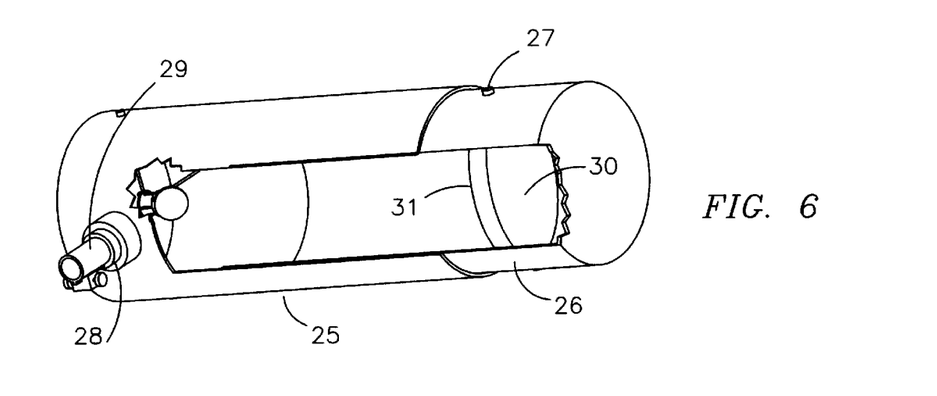

The first method provides for expansion or contraction of the distance between the primary mirror and the secondary mirror by use of telescoping tubes. FIG. 5 illustrates the telescope in the long focal ratio position. FIG. 6 illustrates the short focal ratio position. The distance from the secondary mirror to the primary mirror changes in relation to the change in focal ratio of the primary mirror. The tube will lock into each of the two focal positions with the assistance of adjustable lock-pin assemblies. Telescoping techniques will utilize current art for close tolerance (such as that found on high quality tripods). This method is not feasible for use if selected focal ratios are far apart (e.g. FIG. 4 and FIG. 11). An automated version of this telescope would work as follows: the operator activates a switch on the telescope tube which causes both the primary mirror to flip and the tube to adjust to the proper length. A manual mechanical version would require the operator to turn the mirror (via a knob), lock the mirror to the newly selected position and manually adjust telescope length.

Figure 7:
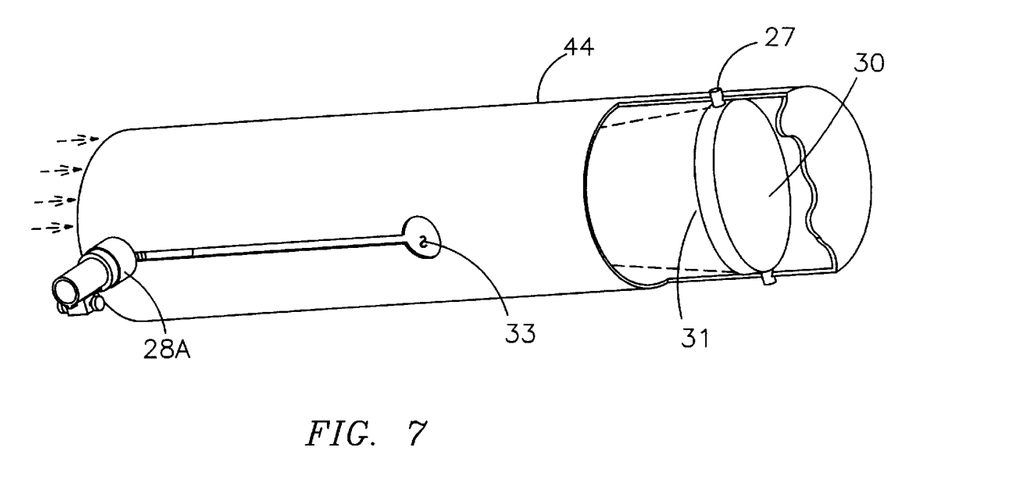
FIGS. 7 and 8 illustrate a movable secondary mirror deployment.
Figure 8:
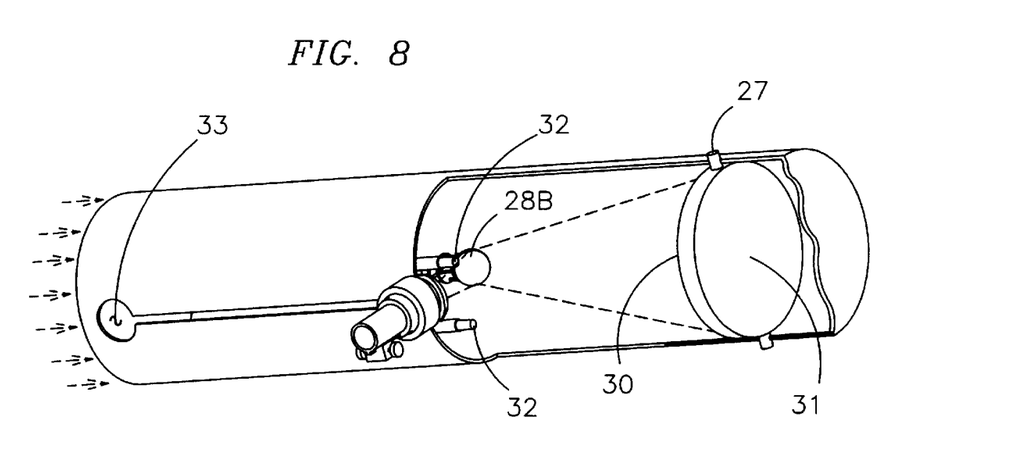

The second method uses a fixed length telescope tube and a slide mechanism which allows movement of the telescope's secondary mirror and focuser assembly between two points. The telescope tube is fitted with a dual-rail assembly on which the focuser is slid between two fixed positions. The tube has two holes large enough to provide viewing through a selected eyepiece. There is also a slit between the two holes which provides for the movement of the secondary mirror stalk with the focuser assembly. The focuser assembly and secondary mirror support stock are an integral unit (currently available art) and travel together. Adjustable lock-pins fix the eyepiece assembly to the slide rail at either of the focal positions. FIG. 7 depicts the "long" focal position and FIG. 8 the "short" focal-ratio position.

Figure 11:
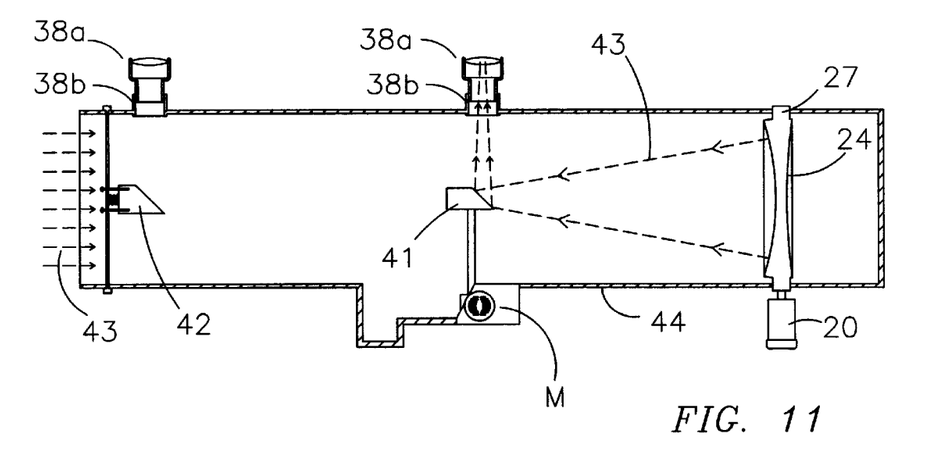
FIGS. 11 and 12 illustrate a preferred two-eyepiece implementation.
Figure 11A:
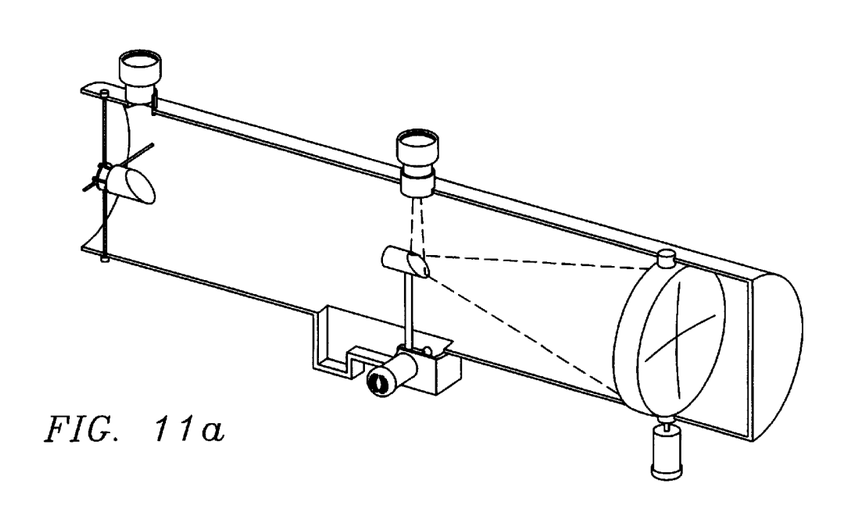
Figures 12, 12A:
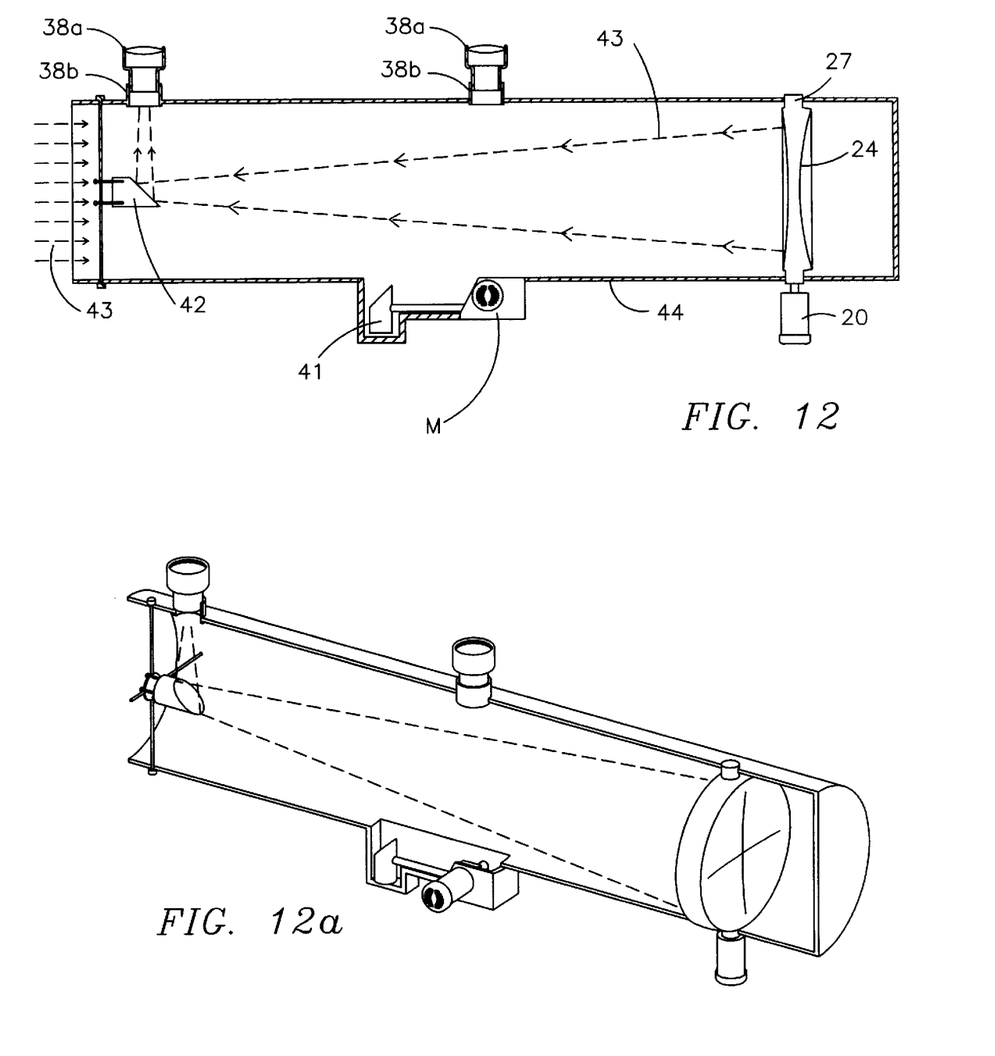

The third, and a preferred economical method, provides two eyepiece assemblies and two secondary mirrors mounted on a single telescope tube. A different eyepiece assembly and secondary mirror are used for viewing with each of the primary mirror's reflecting surfaces. When the primary mirror is in the long focal-ratio position (See FIG. 12), the secondary mirror relevant to small focal-ratio viewing is removed from the reflected light path. This is accomplished by activation of a motorized pivot located at the base of the secondary mirror support stalk. FIGS. 11 and 12 illustrate the scope in short and long focal-ratio positions respectively. Motorized pivot points are represented in FIGS. 11 and 12 with an encircled 'M'. A small section of the telescope tube is cut out and fitted with a box to permit the secondary mirror to be rotated completely out of the reflected light path when the scope is in the long focal-ratio position. When the operator selects the short focal-ratio position, the primary mirror is flipped to the short ratio position and the secondary mirror associated with short focal-ratio viewing is raised to reflect light to the short ratio eyepiece. An advantage of method three is that eyepieces and mirrors can easily be collimated and focused in relation to each other and the object to be observed. Also, with this configuration, the short focal-ratio option can be used as a finder scope to help aim the scope for long ratio viewing (thus eliminating the need or desirability of an add-on finder scope). An object to be viewed can be found under the short focal-ratio option with a low-magnification eyepiece and the user can quickly change to high magnification by switching to the long ratio position. This embodiment could alternately be implemented by a two-step manual operation to rotate the primary mirror and raise or lower the small ratio secondary mirror.

Figure 13:
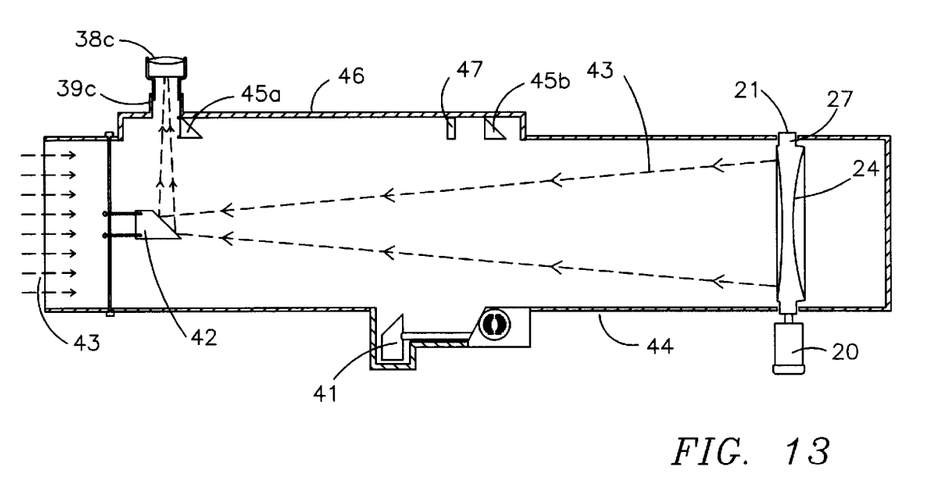
FIGS. 13 and 14 illustrate a more elaborate preferred single eyepiece implementation.
Figure 13A:
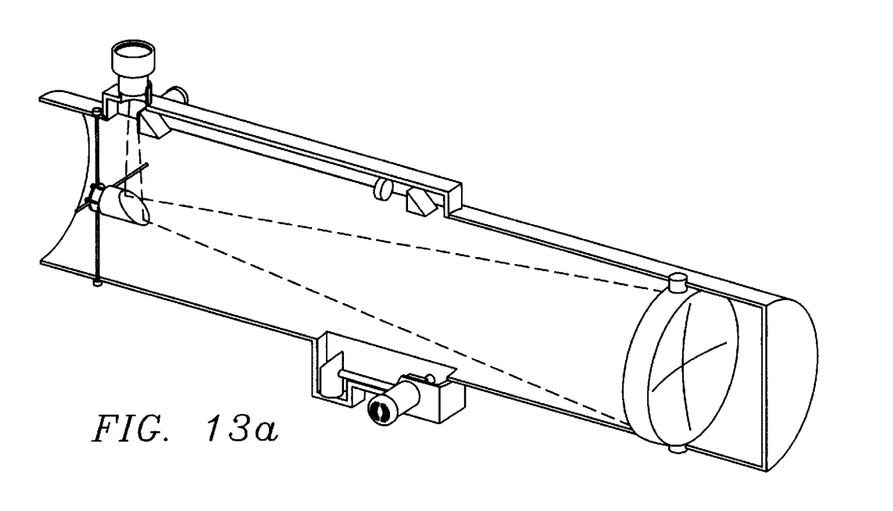
Figure 14:
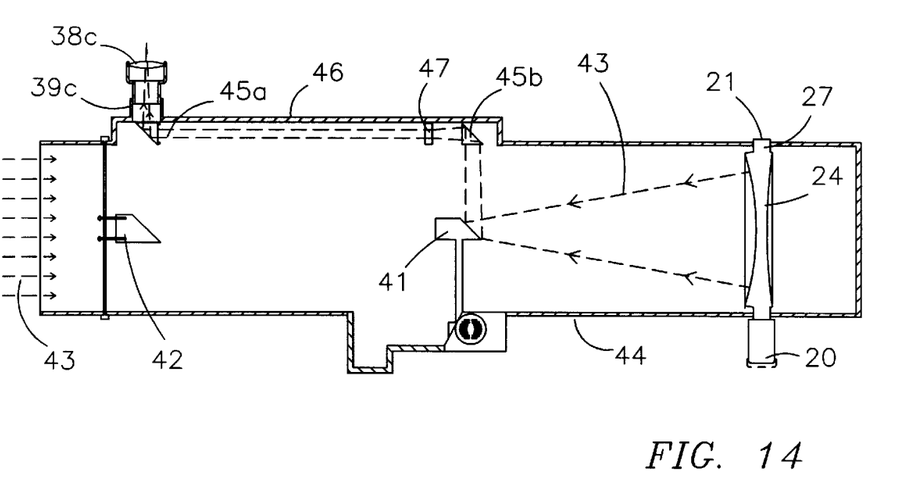
Figure 14A:
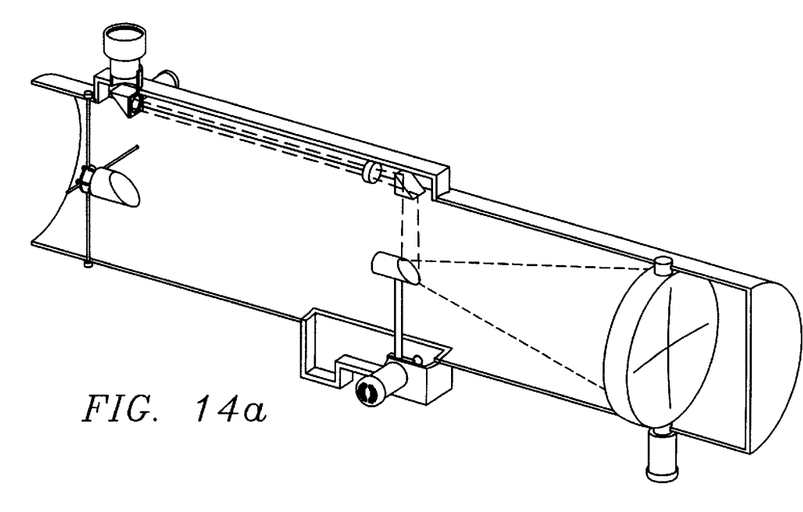

The fourth and a preferred, but higher priced, method provides for a fixed telescope tube length and a single fixed eyepiece location. This method uses an optical relay system (an adaptation of currently available art), two secondary mirrors, supporting electrical motors, switches and mechanical structures to permit shifting between the two primary focal ratios. FIG. 13 illustrates the scope in the long focal-ratio position. Light (43) enters the scope; is reflected off the primary mirror; is again reflected off the stationary secondary mirror and is viewed through the eyepiece (38C). (The prisms and optical relay lens system are not used when the scope is in this position). Three electro-mechanical devices facilitate shifting between the two possible focal ratios. An encircled 'M' illustrates the position of motors to support movement of the "primary mirror," the "movable mirror," and "Prism 1". When the operator selects the long focal ratio position by triggering a two position switch, the "primary mirror" is flipped and both the "movable mirror" and "Prism 1" are moved out of the reflected light path. Operation in this long focal ratio mode is identical to current art Newtonian telescopes. FIG. 14 illustrates the short focal ratio position. When the operator selects the short focal ratio position, the "primary mirror" flips, the "movable mirror" raises and diverts light to "prism 2". "Prism 2 diverts light 90 degrees through the relay lenses. The relay lenses pass the reflected image to "Prism 1" which then diverts 90 degrees through the focuser (39C) to the eyepiece. The use of prisms in the optical relay system also causes the viewed image to be non-reversed and turned right side up. The advantages of method 4 over method 3 are that the telescope user does not have to change body position when shifting between short and long focal ratio positions and image correction is automated. However, in method 4 it is more difficult to use the short focal ratio option as a "finder scope" for long focal ratio viewing. Use of a remote finder scope is therefore preferred for method 4.

Figure 9:
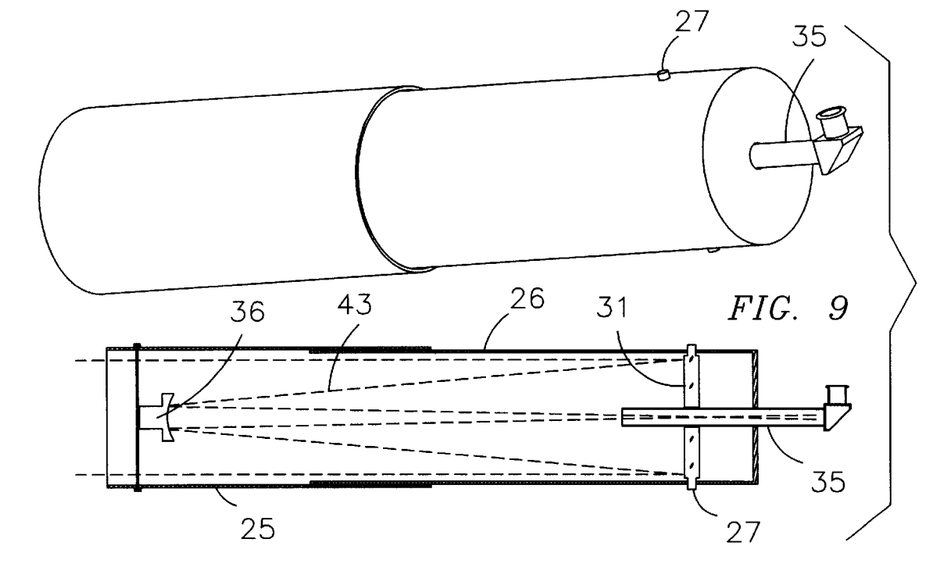
FIGS. 9 and 10 illustrate a Schmidt-Cassegrain type implementation.
Figure 10:
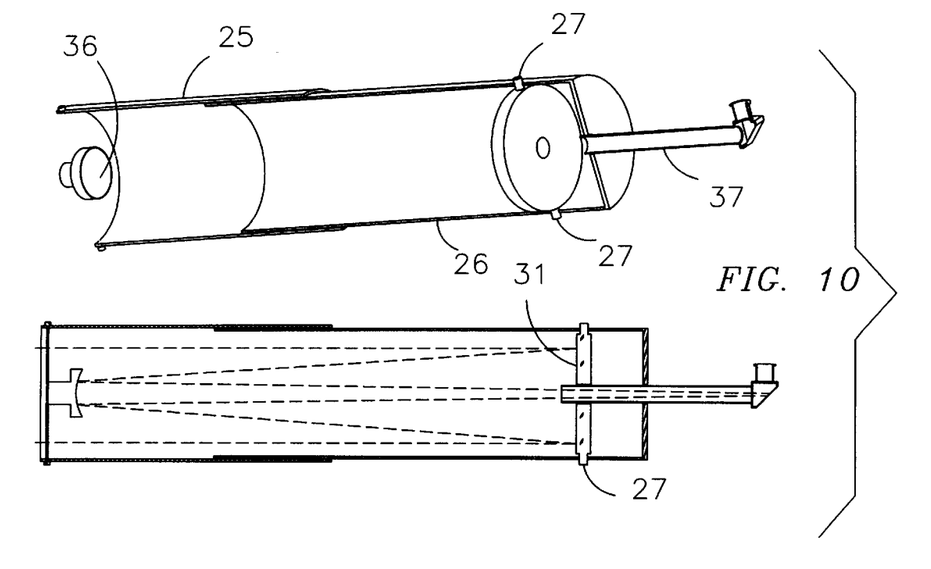

Description and operation of alternate embodiment for Schmidt-Cassegrain and Maksutov-Cassegrain type telescopes. A dual-focal-ratio primary mirror can also be adapted for use in a Schmidt-Cassegrain or Maksutov-Cassegrain type telescope. These telescopes use a rear-mounted eyepiece and focal length splitting strategy which reduces the need for a long telescope tube as found in traditional Newtonian type reflector scopes. This strategy involves a hole in the center of the primary mirror through which a reflected image is sent to the eyepiece. To prevent aberrant light disturbance under less than ideal telescope collimation, a focuser tube, used to funnel light to the eyepiece usually protrudes through the hole in the primary mirror and extends toward the front of the scope (See FIG. 9). To facilitate flipping of the mirror in a dual-focal-ratio design the focuser tube must be temporarily extracted from the hole in the primary mirror (See FIG. 10). This will be done by releasing a finger-screw lock-pin assembly on the tube mounting bracket located on the back plate of the scope; pulling the tube out to a position to facilitate flipping the primary mirror; flipping the primary mirror as described earlier; and re-inserting the tube through the primary mirror to a set fixed position. A retention ring will be provided on the focuser tube to prevent the tube from slipping completely out of the scope when it is pulled to the flip position. A hand screw assembly with fixed position lock point will be used to assure precise alignment when the focuser tube is re-installed. A telescoping tube assembly, similar to that shown in FIG. 5 and FIG. 6 is most practical for the Schmidt-Cassegrain or Maksutov-Cassegrain design because their designs usually use a secondary mirror placed on a semi-transparent disk at the front of the scope to reflect the image back through the primary mirror to the eyepiece.

The "Multi-Focal-Ratio Reflector Telescope" has many advantages over current art. A telescope user can have one scope which serves the function of two or more. The overall cost of this scope will often be less than the cost of two scopes with appropriate accessories. The use of a multi-focal-ratio primary mirror multiplies the advantage of using certain eyepieces. Also, in some embodiments, a short focal-ratio configuration can be used as a finder or pointer for a long ratio position thus reducing the need for other telescope accessories.

The scope of this invention is any reflector telescope using a multi-sided and finished primary mirror that can be rotated or flipped and that incorporates a strategy to adjust effective telescope length for focus due to the use of at least two focal ratios. Although several embodiments of the invention have been discussed in this disclosure document, other configurations are possible. Embodiments preferred by the inventor are illustrated in FIGS. 11, 12, 13, and 14.

The dual-focal-ratio embodiments outlined in this application are feasible given current art practices and cost factors. However, this invention could set the stage for other multiple focal ratio primary mirror options using the basic principle of shared substrate and rotation around a common axis. Options for increase in the number of primary reflection surfaces will increase as it becomes cost effective for a lighter weight rigid substrate that can hold proper curves and reflective finish. These developments must also be accompanied by more sophisticated strategies for incremental variance of effective focal length.

Number identifiers used in the Figures are described as follows: 15=Point of focus, 16=The reflective surface of a primary mirror, 17=The plane of lamination of two primary mirrors joined to become one dual-sided mirror, 19=Lock pin holes, 20=Primary mirror pivot motor assembly, 21=Pivot bearing assembly, 22=Primary mirror retaining ring, 23=Ring tightener, 24=Primary mirror face in a position that is helpful to illustrating the retaining ring assembly but is approximately 90 degrees rotated from a normal viewing position, 25=Outer tube of a telescoping tube assembly, 26=Inner tube of a telescoping tube assembly, 27=Primary mirror pivot, 28=Secondary mirror, 28A=Secondary mirror in long focal ratio position, 28B=Secondary mirror in short focal ratio position, 29=Focuser hole in telescope tube, 30=Primary mirror in long focal ratio position, 31=Primary mirror in short focal ratio position, 32=Secondary mirror and focuser slide assembly, 33=Focuser hole locations for dual hole system, 34=Secondary mirror stem slit, 35=Focuser tube in viewing position, 36=Secondary mirror affixed to the plate at the front of a Schmidt Cassegrain type telescope, 37=Focuser tube in the position to allow flipping of the primary mirror, 38A=Eyepiece for long focal ratio viewing, 38B=Eyepiece for short-focal-ratio viewing, 39A=Focuser assembly for long focal ratio viewing, 39B=Focuser assembly for short focal ratio viewing, 41=Movable secondary mirror, 42=Stationary secondary mirror, 43=Illustration of direction and angle of light flow through a telescope, 44=Telescope tube assembly, 45A=Prism number one used to divert light coming from the relay lenses to the eyepiece assembly (in the short focal ratio position), 45B=Prism number two used to divert light from the secondary mirror through the relay lens, 46=Prism pivot assembly, 47=Relay lenses, 48A=Short focal length, 48B=Long focal length (The distances of 48A and 48B are dependent upon the focal ratio at which faces of the primary mirror are cut).

I claim:

1. A multiple focal length reflecting telescope, comprising:
   (A) a telescope tube assembly;
   (B) a primary mirror, carried within the telescope tube assembly, having a first reflective surface cut to result in a first focal length and a second reflective surface cut to result in a second focal length;
   (C) primary mirror moving means for moving the primary mirror from a first position wherein the first reflective surface is moved into an optical path defined within the telescope to a second position wherein the second reflective surface is moved into the optical path defined within the telescope; and
   (D) a secondary mirror, carried within the telescope tube assembly.

2. A multiple focal length reflecting telescope, comprising:
   (A) a primary mirror having a first reflective surface cut to result in a first focal length and a second reflective surface cut to result in a second focal length;
   (B) primary mirror moving means for moving the primary mirror from a first position wherein the first reflective surface is moved into an optical path defined within the telescope resulting in a first focal length to a second position wherein the second reflective surface is moved into the optical path defined within the telescope resulting in a second focal length; and
   (C) secondary mirror moving means for moving a secondary mirror between a first position, wherein the secondary mirror is spaced from the primary mirror by a first focal length, and a second position, wherein the secondary mirror is spaced from the primary mirror by a second focal length.

3. The multiple focal length reflecting telescope of claim 2, wherein the secondary mirror moving means comprises a telescoping tube assembly comprising telescopically related inner and outer tubes, the outer tube carrying the secondary mirror and the inner tube carrying the primary mirror, whereby a distance between the primary and secondary mirrors is adjustable between the first and second focal lengths.

4. The multiple focal length reflecting telescope of claim 2, wherein the secondary mirror moving means comprises a slide mechanism supporting the secondary mirror.

5. A multiple focal length reflecting telescope, comprising:
   (A) a primary mirror having a first reflective surface and a second reflective surface;
   (B) means for moving the primary mirror from a first position wherein the first reflective surface is moved into an optical path defined within the telescope to a second position wherein the second reflective surface is moved into the optical path defined within the telescope;
   (C) a first secondary mirror in a first position for use with the first reflective surface of the primary mirror; and
   (D) second secondary mirror moving means for moving a second secondary mirror into a second position for use with the second reflective surface of the primary mirror.

* * * * *